US011935287B2

(12) United States Patent
Stroud et al.

(10) Patent No.: US 11,935,287 B2
(45) Date of Patent: Mar. 19, 2024

(54) IMAGE-BASED PROPERTY CONDITION DETERMINATION SYSTEMS, METHODS, AND DEVICES

(71) Applicant: HouseCanary, Inc., San Antonio, TX (US)

(72) Inventors: Christopher V. Stroud, San Antonio, TX (US); Jeremy David Sicklick, Tiburon, CA (US); Alexander Villacorta, Louisville, CO (US); Brittany Murphy, Mico, TX (US); Evgeny Turnaev, San Mateo, CA (US)

(73) Assignee: HouseCanary, Inc., San Antonio, TX (US)

( * ) Notice: Subject to any disclaimer, the term of this patent is extended or adjusted under 35 U.S.C. 154(b) by 487 days.

(21) Appl. No.: 17/276,810

(22) PCT Filed: Sep. 18, 2019

(86) PCT No.: PCT/IB2019/057837
§ 371 (c)(1),
(2) Date: Mar. 16, 2021

(87) PCT Pub. No.: WO2020/058856
PCT Pub. Date: Mar. 26, 2020

(65) Prior Publication Data
US 2021/0357642 A1 Nov. 18, 2021

Related U.S. Application Data

(60) Provisional application No. 62/733,052, filed on Sep. 18, 2018.

(51) Int. Cl.
*G06V 10/00* (2022.01)
*G06Q 30/0601* (2023.01)
(Continued)

(52) U.S. Cl.
CPC ....... *G06V 20/176* (2022.01); *G06Q 30/0643* (2013.01); *G06Q 50/16* (2013.01); *G06T 7/0008* (2013.01)

(58) Field of Classification Search
CPC ........ G06N 20/00; G06N 3/08; G06N 3/0454; G06V 20/176; G06Q 50/16;
(Continued)

(56) References Cited

U.S. PATENT DOCUMENTS 5,414,621 A * 5/1995 Hough ............... G06Q 30/0205
705/7.34
5,857,174 A * 1/1999 Dugan ................... G06Q 50/16
705/313

(Continued)

FOREIGN PATENT DOCUMENTS

WO 2018084216 A1 5/2018

OTHER PUBLICATIONS

WIPO, International Search Report received in International Application No. PCT/IB2019/057837, dated Jul. 3, 2020, (4p.).

(Continued)

*Primary Examiner* — Amir Alavi
(74) *Attorney, Agent, or Firm* — Siritzky Law, PLLC

(57) ABSTRACT

A computer-implemented image-based property condition determination system and method are provided. The method includes determining one or more element condition ratings from individual images of the property; and determining an overall property condition based on available element condition ratings of the property. An overall condition rating of a portfolio comprising a plurality of properties is determined using the condition ratings of properties in the portfolio.

20 Claims, 24 Drawing Sheets

(51) Int. Cl.
*G06Q 50/16* (2012.01)
*G06T 7/00* (2017.01)
*G06V 20/10* (2022.01)

(58) Field of Classification Search
CPC ............ G06Q 30/0278; G06Q 30/0643; G06T 7/0008; G06F 17/30876; G06F 17/30241; G06F 17/30525
See application file for complete search history.

(56) References Cited

U.S. PATENT DOCUMENTS

| | | | |
|---|---|---|---|
| 10,102,586 B1* | 10/2018 | Marlow | B64C 39/024 |
| 10,586,163 B1* | 3/2020 | Mauseth | G06F 16/285 |
| 11,423,496 B2* | 8/2022 | Takenaka | G06Q 30/06 |
| 11,734,634 B2* | 8/2023 | Kalinski | G06F 18/2193 |
| | | | 705/7.28 |
| 2012/0254156 A1 | 10/2012 | Rao | |
| 2014/0074733 A1 | 3/2014 | Herder et al. | |
| 2014/0365400 A1 | 12/2014 | Fiala et al. | |
| 2015/0213315 A1 | 7/2015 | Gross | |
| 2016/0048934 A1* | 2/2016 | Gross | G06V 10/40 |
| | | | 705/313 |

OTHER PUBLICATIONS

WIPO, International Written Opinion received in International Application No. PCT/IB2019/057837, dated Jul. 3, 2020, (5p.).

* cited by examiner

FIG. 3A

| PROPERTY | PROPERTY INFORMATION | PROPERTY IMAGE INFORMATION |
|---|---|---|
| PROPERTY #1 | PROPERTY #1 INFO. | IMAGE INFO. #1 |
| PROPERTY #2 | PROPERTY #2 INFO. | IMAGE INFO. #2 |
| ⋮ | ⋮ | ⋮ |
| PROPERTY #M | PROPERTY #M INFO. | IMAGE INFO. #M |

| PROPERTY IMAGE INFORMATION | | |
|---|---|---|
| IMAGE | IMAGE INFORMATION | ELEMENT(S)/ECR(S) |
| IMAGE #1 | INFO. #1 | <ELEMENT A, ECR1>, <ELEMENT B, ECR2> |
| IMAGE #2 | INFO. #2 | <ELEMENT A, ECR3> |
| ⋮ | ⋮ | ⋮ |
| IMAGE #K | INFO. #K | ELEMENT/ECR PAIR(S) |

FIG. 3B

FIG. 4A
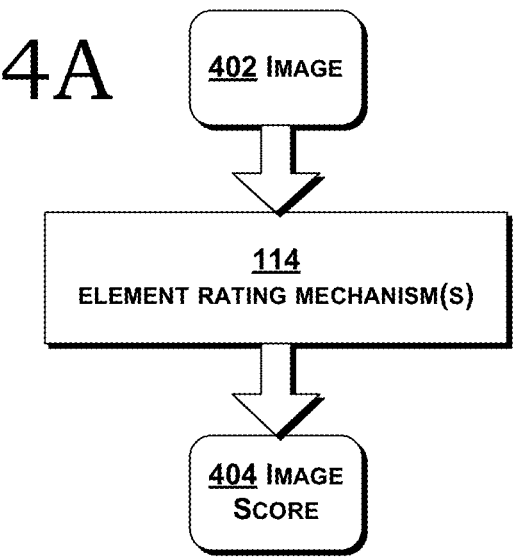
FIG. 4B
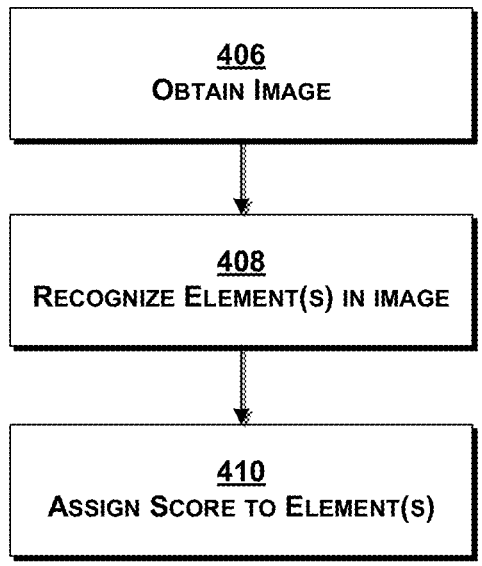
| IMAGE SCORE |||||
|---|---|---|---|---|
| P0 | P1 | ... || P8 |
FIG. 4C

| 502 TRAINING DATASET |||
|---|---|---|
| IMAGE | IMAGE INFORMATION | ELEMENT(S)/ECR(S) |
| IMAGE #1 | INFO. #1 | <ELEMENT A, ECR1> |
| IMAGE #2 | INFO. #2 | <ELEMENT A, ECR3> |
| ⋮ | ⋮ | ⋮ |
| IMAGE #Q | INFO. #Q | ELEMENT/ECR PAIR |

FIG. 6A
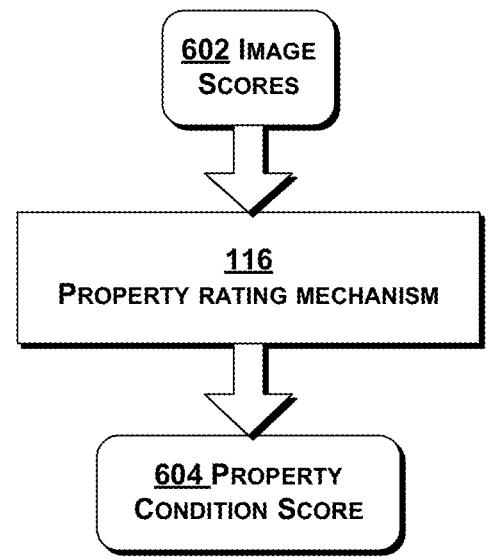
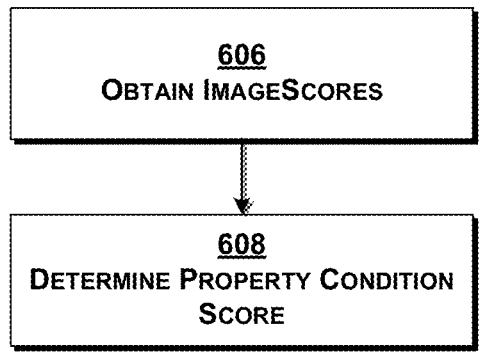
FIG. 6B
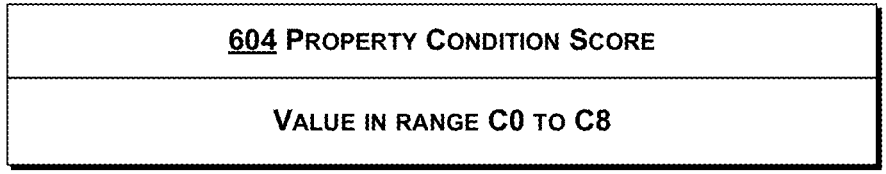
FIG. 6C

HUMAN LABEL: FRONT
V5 IMAGE SCORES

| CLASS | P(class) |
|---|---|
| BAD_HIGH | 0.441 |
| SUBPAR_LOW | 0.405 |
| SUBPAR_HIGH | 0.069 |

HUMAN LABEL: FRONT
V5 IMAGE SCORES

| CLASS | P(class) |
|---|---|
| BAD_HIGH | 0.587 |
| SUBPAR_LOW | 0.204 |
| BAD_LOW | 0.104 |

FIG. 14A
FIG. 14B

FIG. 14C
FIG. 14D

FIG. 15A
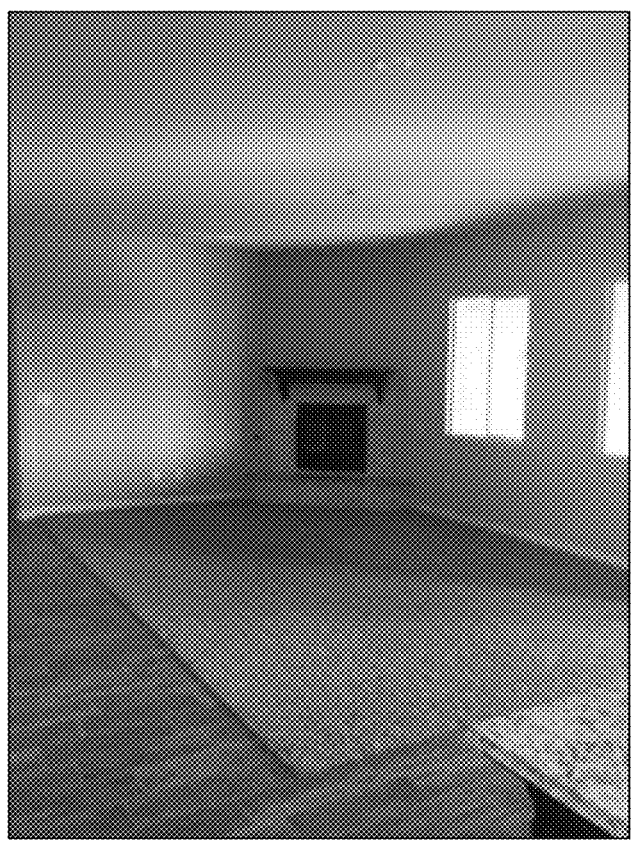
FIG. 15B

IMAGE-BASED PROPERTY CONDITION DETERMINATION SYSTEMS, METHODS, AND DEVICES

RELATED APPLICATION

This application is the National Stage in the United States (a 371) of International Application No. PCT/IB2019/057837, filed Sep. 18, 2019, the entire contents of which are hereby fully incorporated herein by reference for all purposes. PCT/IB2019/057837 claims the benefit of U.S. Provisional Application No. 62/733,052, filed Sep. 18, 2018, the entire contents of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to determining the condition of real property using visual imagery as an input. More particularly, this invention relates to frameworks, systems, and methods for automated determination of the condition of real property based on image data of the property.

BACKGROUND

Assessing the condition of a property currently requires human on-site inspection by licensed professionals such as real-estate agents, appraisers, or home inspectors. The primary goals of these on-site inspections are often two-fold; first, to verify the property location and zo existence as of that date, and second, to estimate the property condition, either external and/or internal, depending on access. These human on-site inspections are labor intensive, time intensive and costly.

SUMMARY

The present invention is specified in the claims as well as in the below description. Preferred embodiments are particularly specified in the dependent claims and the description of various embodiments.

In general, without limitation, and according to exemplary embodiments hereof, the property condition determination system may determine an estimate of a real property's physical condition from imagery associated with that property.

Below is a list of method or process embodiments. Those will be indicated with a letter "P".

P1. A computer-implemented method of determining a condition of a given property, the method comprising: determining a particular property condition rating of the given property based on one or more images of the given property.

P2. The method of embodiment P1, further comprising: determining one or more element condition ratings corresponding to said one or more images, wherein said particular property condition rating is based on said one or more element condition ratings.

P3. The method of embodiment P2, wherein said one or more element condition ratings are determined by an element condition rating mechanism that was trained on a plurality of known images with known condition ratings.

P4. The method of any one of the preceding embodiments, wherein the particular property condition rating is determined by a property condition rating mechanism that was trained on a plurality of known property condition ratings and their corresponding image element condition ratings.

P5. The method of any one of the preceding embodiments, wherein each of said one or more images represents at least one element of the given property.

P6. The method of embodiment P5, wherein at least one element of the given property is selected from the group comprising: a kitchen, a room, a master bedroom, a master bathroom, a bedroom, a bathroom, a living room, a house, a front of a house, a side of a house, a back of house, a basement, a yard of a house, a door, a roof, a fence, and a window.

P7. The method of any one of the preceding embodiments, wherein the particular property condition rating of the property is time-based.

P8. The method of any one of the preceding embodiments, wherein the images used to determine the particular property condition rating were selected based on time and/or date information associated with each image.

P9. The method of any one of the preceding embodiments, further comprising: (D) determining a second property condition rating of a second property based on the property condition rating of the given property determined in (A).

P10. The method of the preceding embodiment P9, wherein the second real property is similar to the given property.

P11. The method of any one of the preceding embodiments, wherein the particular property condition rating is a discrete value corresponding to one of a plurality of discrete property conditions.

P12. The method of any one of embodiments P1 to P10, wherein the particular property condition rating is a real value corresponding to a continuous range of discrete property conditions P13. The method of any one of the preceding embodiments, wherein the given property is a real property.

P14. A computer-implemented method of determining an overall condition rating of a portfolio comprising a plurality of properties, the method comprising:
(A) determining a plurality of property condition ratings by, for each particular property in the portfolio,
  (A)(1) determining a particular property condition rating for said particular property based on one or more images of the particular property; and
(B) determining the overall condition rating of the portfolio as a given function of the plurality of property condition ratings determined in (A).

P15. The method of embodiment P14, wherein the given function averages the plurality of property condition ratings to determine the overall condition rating of the portfolio.

P16. The method of embodiment P15, wherein the given function determines a weighted average of the plurality of property condition ratings to determine the overall condition rating of the portfolio.

P17. The method of any one of claims P14-P16, wherein said determining in (A)(1) further comprises:
determining one or more element condition ratings corresponding to said one or more images of the particular property, wherein
said particular property condition rating is based on said one or more element condition ratings.
P18. The method of embodiment P17, wherein said one or more element condition ratings are determined by an element condition rating mechanism that was trained on a plurality of known images with known condition ratings.
P19. The method of any one of embodiments P14-P18, wherein the particular property condition rating of at least one property in the portfolio is determined by a property condition rating mechanism that was trained on a plurality of known images with known condition ratings.
P20. The method of any one of embodiments P14-P19, wherein each of said one or more images of the particular property represents at least one element of the particular property.
P21. The method of embodiment P20, wherein the at least one element of the particular property is selected from the group comprising: a kitchen, a room, a master bedroom, a master bathroom, a bedroom, a bathroom, a living room, a house, a front of a house, a side of a house, a back of house, a basement, a yard of a house, a door, a roof, a fence, and a window.
P22. The method of any one of embodiments P14-P21, wherein the particular property condition rating of each particular property is time-based.
P23. The method of any one of embodiments P14-P21, wherein the images used to determine the particular property condition rating of a particular property were selected based on time and/or date information associated with an image.
P24. The method of any one of embodiments P14-P23, wherein the overall condition rating of the portfolio is time-based.
P25. The method of any one of embodiments P14-P24, wherein the particular property condition rating of a particular property is a discrete value corresponding to one of a plurality of discrete property conditions.
P26. The method of any one of embodiments P14-P24, wherein the particular property condition rating of a particular property is a real value corresponding to a continuous range of discrete property conditions.
P27. The method of any one of embodiments P14-P26, wherein the overall condition rating of the portfolio is a discrete value corresponding to one of a plurality of discrete property conditions.
P28. The method of any one of embodiments P14-P26, wherein the overall condition rating of the portfolio is a real value corresponding to a continuous range of discrete property conditions.
P29. The method of any one of embodiments P14-P27, wherein each property in the portfolio is a real property.
Below is a list of article of manufacture embodiments. Those will be indicated with a letter "A".
A30. An article of manufacture comprising non-transitory computer-readable media having computer-readable instructions stored thereon, the computer readable instructions including instructions for implementing a computer-implemented method, said method operable on a device comprising hardware including memory and at least one processor and running a service on said hardware, said method comprising the method of any one of the preceding method embodiments.
Below is a list of device embodiments. Those will be indicated with a letter "D".
D31. A device, comprising:
(a) hardware including memory and at least one processor, and
(b) a service running on said hardware, wherein said service is configured to:
perform the method of any one of the preceding method embodiments.

The above features along with additional details of the invention are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIGS. 3A-3B show aspects of data structures used according to exemplary embodiments hereof;

FIGS. 4A-4C, 5A-5B, 6A-6D, and 7 depict aspects of a property condition determination framework according to exemplary embodiments hereof;

FIGS. 13A-13E, 14A-14D, 15A-15E, and 16A-16E are photographs corresponding to the pictures in FIGS. 8A-8E, 9A-9D, 10A-10E, and 11A-11E, respectively.

DETAILED DESCRIPTION OF THE PRESENTLY PREFERRED EXEMPLARY EMBODIMENTS

As used herein, unless used otherwise, the following terms and abbreviations have the following meanings:
API means application programming interface;
GUI means graphical user interface;
OCR means overall condition rating;
UI means user interface; and
As used herein, the term "mechanism," as used herein, refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

As used herein, the term "real property" generally refers, without limitation, to any property that is attached to land, as well as the land itself. Real property not only includes buildings and other structures, but also rights and interests. Property and real property can be rental or residential or commercial. Furthermore, there are situations where a structure such as a mobile home sitting on rented land would be classified as "personal property" instead of "real property". The system herein could identically be applied to the mobile home regardless of the legal classification "personal property". It should be appreciated that the system described herein is not limited in any way by the type or nature of the property. The term "property" generally refers to real property.

Overview and Structure

It is desirable, and an object hereof, to provide systems and methods to estimate the overall condition of a property from existing data, specifically imagery, and preferably without human input.

Figure 1:
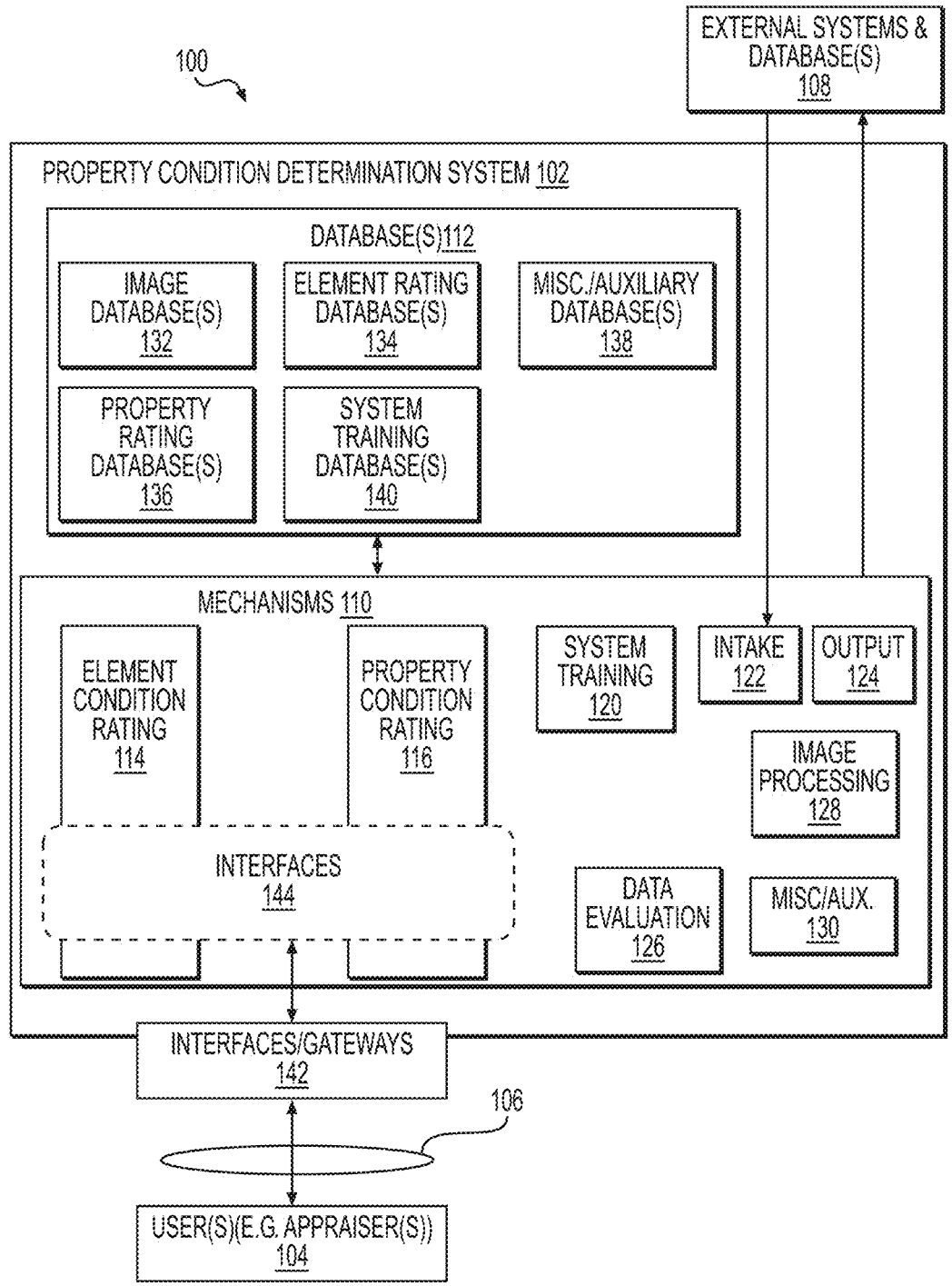
FIGS. 1-2 shows an overview of aspects of a property condition determination framework according to exemplary embodiments hereof.

FIG. 1 shows aspects of an exemplary framework 100 for a property condition determination system 102 according to exemplary embodiments hereof. As shown in the drawing, a property condition determination system 102 may be accessed by users 104, e.g., via one or more networks 106 (e.g., the Internet). Each user 104 may access the property condition determination system 102 using one or more computing devices, as is known in the art. The property condition determination system 102 may also access and be accessible by various external systems and/or databases 108 (e.g., banks, services such as the Multiple Listing Service (MLS), and the like).

As shown in FIG. 1, the property condition determination system 102 (sometimes referred to as the "backend" or "backend platform") may comprise various mechanisms 110 (e.g., in the form of software applications) and one or more databases 112, described in greater detail below. The mechanisms 110 may generally interact with the one or more databases 112.

The database(s) 112 may be or comprise multiple separate or integrated databases, at least some of which may be distributed. The database(s) 112 may be implemented in any manner, and, when made up of more than one database, the various databases need not all be implemented in the same manner. It should be appreciated that the system is not limited by the nature or location of database(s) 112 or by the manner in which they are implemented.

Each of the mechanisms 110 is essentially a mechanism (as defined above, e.g., a software application) that may provide one or more services via an appropriate interface. Although shown as separate mechanisms for the sake of this description, it should be appreciated that some or all of the various mechanisms 110 may be combined. The various mechanisms 110 may be implemented in any manner and need not all be implemented in the same manner (e.g., with the same languages or interfaces or protocols).

The mechanisms 110 may include one or more of the following mechanisms:
1. Element condition rating mechanism(s) 114
2. Property condition rating mechanism(s) 116
3. Training/learning mechanism(s) 120
4. Intake mechanism(s) 122
5. Output mechanism(s) 124
6. Data evaluation mechanism(s) 126
7. Image recognition/processing mechanism(s) 128
8. Miscellaneous/auxiliary mechanisms 130

Note that the above list of mechanisms/mechanisms is exemplary, and is not intended to limit the scope of the system 102 in any way. Those of ordinary skill in the art will appreciate and understand, upon reading this description, that the system 102 may include any other types of data processing mechanisms, image recognition mechanisms, and/or other types of zo mechanisms that may be necessary for the system 102 to generally perform its functionalities as described herein. In addition, as should be appreciated, embodiments or implementations of the system 102 need not include all of the mechanisms listed, and that some or all of the mechanisms may be optional.

The database(s) 112 may include one or more of the following database(s):
1. Images database(s) 132
2. Element condition ratings database(s) 134
3. Overall property condition ratings database(s) 136
4. System training database(s) 140
5. Miscellaneous and auxiliary database(s) 138

The above list of databases is exemplary, and is not intended to limit the scope of the system 102 in any way.

The images database(s) 132 may include images of properties and/or of property elements. The elements of a property may include any of the property's features, including features such as the kitchen, the bathrooms, the bedrooms, the yard, the front of the house, etc.

The element condition ratings database(s) 134 may include of condition ratings (e.g., assigned condition ratings) of property elements.

As shown in FIG. 1, the property condition determination system 102 may access one or more external systems and databases 108. This access may include access via intake mechanism(s) 122 which may access external systems in order to obtain data therefrom. Access via output mechanism(s) 124 may be used to provide information (e.g., property condition rating information) to the external systems and/or databases 108. Data evaluation mechanism(s) 126 may evaluate data (e.g., obtained from external systems and databases 108 and/or in the database(s) 112) in order to determine information therefrom. The data evaluation mechanism(s) 126 may, e.g., include one or more mechanisms to determine consistency of property condition ratings, etc.

Various mechanisms 110 in the property condition determination system 102 may be accessible via interface(s) 144. These interfaces 144 may be provided in the form of APIs or the like, made accessible to external users 104 via one or more gateways and interfaces 142. For example, the property condition rating mechanism(s) 116 may provide APIs thereto (via interface(s) 142), and the backend 102 may provide external access to aspects of the property condition rating mechanism(s) 116 (to users 104) via appropriate gateways and interfaces 142 (e.g., via a web-based mechanism and/or an mechanism running on a user's device).

Images

It may be preferable that each provided image be of high enough resolution (e.g., 72 dpi), with adequate lighting, brightness and contrast such that the represented element(s) within the image may be discernable.

Images may be provided to the system from various sources and/or combinations of various sources. For example, an owner of the property (homeowner) may take and provide photographs and/or video using his/her smart phone or camera. A real estate listing agent may do the same. Imagery obtained during an on-site property inspection may also be used. In addition, the images may be provided by an outside source such as the Multiple Listing Service (MLS), Google Street View, satellites, aerial vehicles such as drones, or from any other source that may take and/or possess images that may be adequate for use. It may be preferable that the images be in electronic format (digital photographs, scanned pictures, etc.) so that the images may be input directly into the system.

Images may also be obtained from a video of the property. The system may have the ability to parse out images of the elements from video footage, to identify and capture particular frames of the video that may include the elements that may be desired, and to store these images to be processed by the application.

Regardless of the source, it may be preferable that each image be electronically time-stamped and geo-coded. The time stamping of each image may allow for the images to be grouped by the date and time the images were taken. In this way, the system may choose to use the most recently taken images that may best represent the most current condition of the elements that the images may depict. It may be preferable that all of the images be taken at about the same time and as recently as possible. In this way, the images may be consistent and up-to-date. However, this may not be necessary if not possible. The geo-code information of each image may be used to identify the exact location of the property depicted in each image, and may be used to confirm or verify that the property depicted in the image is the correct property, and thus to authenticate the images.

It may also be preferable that each relevant element of the property be represented in at least one image. In this way, the relevant features and elements of a property may be included in the overall property condition calculation. For the purposes of this specification, the term relevant element may refer to any element of the property P that may have a significant effect (whether positive or negative) on the overall condition of the property P. For example, the significant features of a property as shown in the sales listing of the property (e.g., the MLS listing) may be deemed as relevant elements by the system. In the example of a home, the rooms described in the sales listing may be deemed as relevant elements. This may include the kitchen, the living room, the master bedroom, other bedrooms, the master bathroom, other bathrooms, the garage, and other rooms of the home. Other elements of the property described in the listing, such as a pool, new kitchen appliances, new landscaping, a large yard and other types of features may also be deemed as relevant.

A listing of a property's relevant elements may be input into the system and stored in the database(s) 112. In one exemplary implementation, the system may include user interfaces (UI) that may allow users to input this information into the system.

In another exemplary implementation, the system may receive information regarding the relevant property elements from one or more external systems or databases through its intake mechanism 122. In one example, the system may receive the property specifications (including a list of the relevant property elements) from the Multiple Listings Service (MLS). In another example, the system may receive the property specifications from a property appraisal system. The specifications of the property may then be stored in a database for use.

It is understood by a person of ordinary skill in the art that the system may receive information regarding the elements of the property from any source using any means available, including combinations of methods and sources, and that the sources and method by which the system receives the information do not limit the scope of the system in any way.

It is also appreciated that which elements may be deemed as relevant for a particular property may be subjective, and may require human input. Accordingly, the system may also allow a user to modify, edit, amend, add and/or delete property elements (or information regarding particular property elements) within, to or from the system. For example, a user may add an additional relevant element to the system that may not be adequately represented in the MLS listing but that the user may feel is an element of importance (e.g., new kitchen appliances). Conversely, the user may delete an element from the list if the user deems that element irrelevant. Users that may have the ability to perform these actions may be required to obtain and present specific credentials to the system to obtain access to these functionalities.

It may be preferable that at least one element be depicted in each image and that the depicted element(s) be known, understood and adequately identified. The content of the each image (e.g., the element(s) depicted) may be specified to the system at the time of the image input (or at a different time as necessary). The content (element(s)) of each image may be manually entered into a user interface UI by a user during the uploading process, or the system may guide a user through the process of uploading each image and identifying each element within each image (e.g., via a drop-down menu or radio buttons within a dialog box of the UI).

The images may also include metadata or other types of identifying data that may identify the elements depicted in each image.

In one exemplary embodiment hereof, the system may include the ability to recognize element(s) included in each image (e.g., using image recognition mechanisms included in the element condition rating application or elsewhere in the system) such that it may not be necessary for this information to be otherwise provided to the system.

In some cases, a single image may include an adequate view of the complete element such that only one image of the element may be necessary for the assessment of the element's physical condition. In other cases, multiple images of the same element(s) (e.g., taken from different vantage points and/or perspectives) may be required to provide an adequate representation of the element's physical condition.

For example, a single image of the exterior side of a house on the property may be adequate to represent the physical condition of the exterior side of the house. In another example, a large kitchen may require several images taken from different perspectives and/or vantage points (e.g., from the left, from the right, from the entrance, etc.) to adequately capture and represent the condition of the kitchen.

Property Condition Determination

An overview of exemplary processing of the property condition determination system 102 is described with reference to FIG. 2.

A set of one or more images 200-1, 200-2, ... 200-n (individually and collectively 200) associated with a particular real property P may be provided (at 210) to the element condition rating mechanism(s) 114 of system 102. The images may each contain one or more elements of the property P.

The elements 202-1, 202-2, ... 202-n (individually and collectively 202) of the property in the images 200 may include the property's features such as the kitchen, the bathrooms, the bedrooms, the yard, the front of the house, etc. For example, a first image 200-1 may be an image of the front of the house 202-1 that may be located on the property P, a second image 200-2 may be an image of the kitchen 202-2 of the house, a third image 200-3 may be an image of the master bathroom 203-3 of the house, and so on.

It may be preferable that each image shows a particular element 202 of the property P. There may be multiple images of the same element of the property (e.g., multiple images of the kitchen, etc.).

Some property elements may be considered more relevant than others. It may be preferable that each element 202 of the property P be represented in at least one image 200. However, this may not be necessary and only a portion of the relevant elements 202 may be represented in images 200. While less desirable, there may be only one image and/or there may only be images of a particular element. The determination of what elements 202 may or may not be categorized as relevant is discussed below.

The element condition rating mechanism(s) 114 may analyze each provided image 200 (at 220) and, based on each analysis, determine and/or assign a corresponding element condition rating (ECR) 204-$j$ to each image 200-$j$ (or to each individual element 202-$j$), respectively. An image may contain more than one property element (e.g., an external wall and a swimming pool). In such cases the element condition rating mechanism(s) 114 may assign multiple ECRs to that image, one for each property element detected in the image.

The element condition rating(s) for the j-th image 202-$j$ is denoted ECR(s) 204-$j$. The element condition ratings, corresponding to the n images 200 are collectively denoted ECR 204. For example, based on the image 200-1 of the front of the house 202-1, the front of the house may be assigned an element condition rating 204-1, the kitchen 202-2 may be assigned an element condition rating 204-2, and the master bathroom 202-3 may be assigned an element condition rating 204-3, and so on.

Referring again to FIG. 2, the element condition ratings 204 of the image(s) 200 of the property P (determined at 220 from the images 200 by the element condition rating mechanism(s) 114) may be provided to the property condition rating mechanism(s) 116 for analysis and processing. Using and based on the element condition ratings 204, the property condition rating mechanism 116 may generate (at 230) an overall condition rating (OCR) 206 for the property P.

Note that the element rating mechanism(s) 114, the property condition rating mechanism(s) 116, the system training mechanism(s) 120, as well as other mechanisms, may each, or in combination, include mechanisms with machine learning capabilities. Accordingly, the various mechanisms may be trained to perform their respective functionalities as will be described below.

Figure 2:
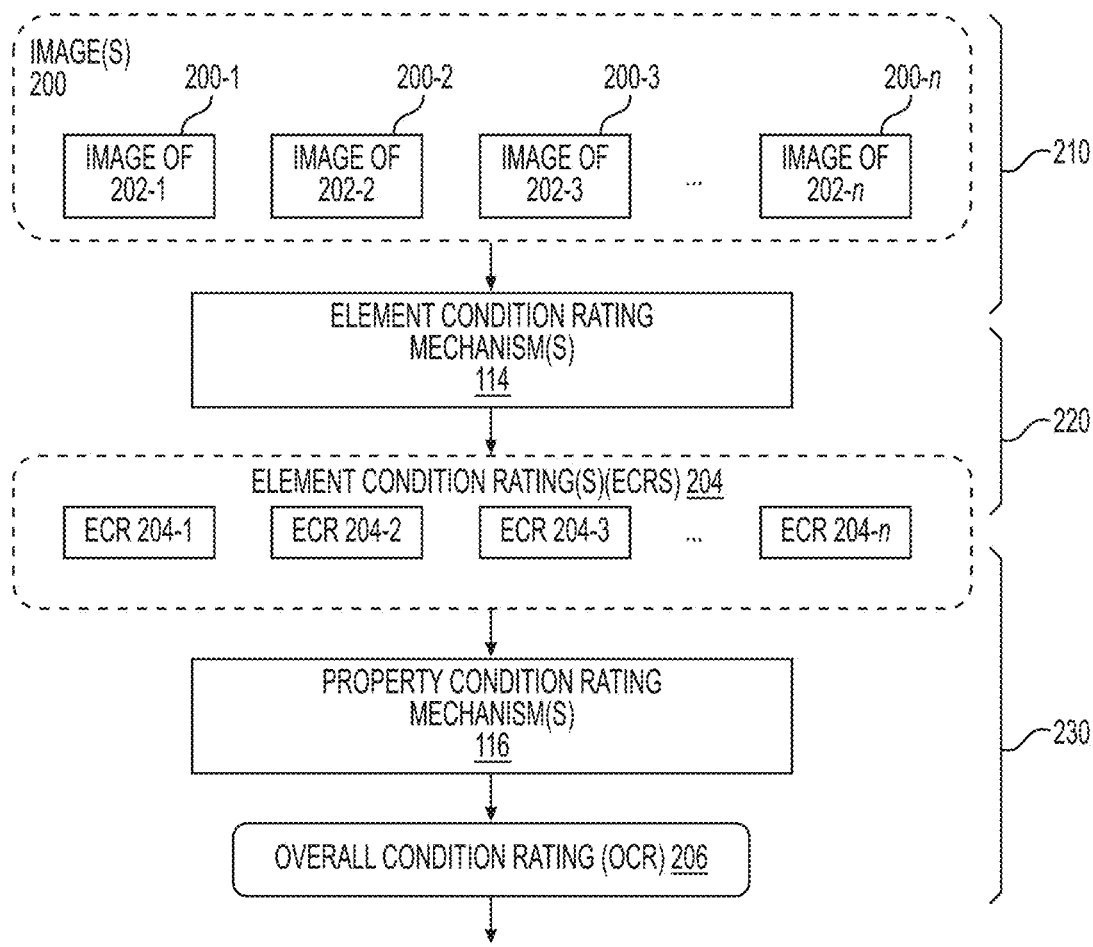

As should be appreciated, the flow in FIG. 2 and in other flow diagrams is provided for conceptual and descriptive purposes and may not represent the exact acts that a particular implementation of the property condition determination system 102 may take, nor are the representations of the acts shown in the drawing all-inclusive of the acts that the property condition determination system 102 may take while performing its functionalities. The acts shown and described may represent a generalized summary of the overall processes. A person of ordinary skill in the art will understand, upon reading this description, that the acts shown may represent the general concept of the functionalities of the system 102, that the steps may be performed in any order, that not all of the acts may be performed, and that other acts not shown may also be performed as required according to the exemplary embodiments of the system 102 hereof. FIG. 2 is meant to convey a general understanding of the system 102 so that the ensuing detailed descriptions in later sections may be more easily understood.

Mechanisms and Data Structures

Specific details of the mechanisms, processes and functionalities of a property condition determination system 102 are now described.

Each real property preferably has a unique identifier in the system, and the database(s) 112 may store information keyed or indexed on the unique property identifiers. For example, as shown in FIG. 3A, the database(s) 112 may include, for each property, property information, and property image information. As shown in FIG. 3B, the property image information may be indexed or keyed on an image identifier, and may include, for each image, the image identifier, image information, and one or more element/ECR pairs. Each element/ECR pair corresponds to an element in the corresponding image, where the "element" defines or describes the element (e.g., kitchen, external wall, door, window, etc.) and the corresponding ECR is a score or ranking assigned to that element (by the element condition rating mechanism(s) 114).

FIGS. 3A-3B show exemplary logical data structures. Those of ordinary skill in the art will appreciate and understand, upon reading this description, that different and/or other data structures may be used. It should also be appreciated that the data represented in each of these data structures may reside in more than one database.

1. The Element Condition Rating Mechanism

As described above, the element condition rating mechanism(s) 114 may receive images that may each, or in combination, depict various elements of the property. The images may then be analyzed by the element condition rating mechanism(s) 114 to determine the physical condition of individual elements represented in the images.

As shown in FIG. 4A, the element condition rating mechanism(s) 114 take as input an image 402 and produce a corresponding image score 404 (which may correspond to the element condition rating—ECR—for that image).

Operation of the element condition rating mechanism(s) 114 on a single image is described with reference to the flowchart in FIG. 4B. The element condition rating mechanism(s) 114 obtains an image (at 406) (e.g., from image database(s) 132), recognizes one or more elements in the image (at 408), and assigns a score or rating to each element (at 410). The elements and corresponding scores may be stored in the database(s), e.g., as element/ECR pairs in the appropriate property image information (FIG. 3B).

In a preferred exemplary implementation, the system may have a series of condition classes and the image score 404 may be a corresponding series of probabilities for each condition class. For example, the system may use nine condition classes $C_0$ to $C_8$, the image score may be a corresponding series of probability values $P_0$ to $P_8$, where probability value $P_i$, a value in the range 0.0 to 1.0, represents the probability that the property (or property element) in the image has condition $C_i$, as determined by the element rating mechanism 114. The condition classes $C_0$ to $C_8$ may represent mutually exclusive classes in which case their associated probabilities $P_0$ to $P_8$ will sum to 1.0, or they may represent overlapping non-mutually exclusive classes in which case the sum of probabilities $P_0$ to $P_8$ may exceed 1.0.

The image score 404 may be stored in a data structure such as shown in FIG. 4C, by storing the series of probability values.

An exemplary implementation uses the nine (9) condition classes shown in the following table (Table I):

TABLE I

| 0 | fire damage |
|---|---|
| 1 | bad low |
| 2 | bad high |
| 3 | subpar low |
| 4 | subpar high |
| 5 | ok/average |
| 6 | very good low |
| 7 | very good high |
| 8 | new |

Those of ordinary skill in the art will appreciate and understand, upon reading this description, that different and/or other condition classes may be used. For example, a system may use six (6) condition classes such as: fire damage, poor, subpar, average, good, very good.

System Training

In exemplary embodiments hereof, the element rating mechanism(s) 114 may include a machine-learning (ML) model (denoted ML1) that may be trained to adequately assess and rate zo the condition of one or more elements represented in an image. For the purposes of this specification, when the element rating mechanism(s) 114 is referenced, it is understood that the referenced mechanism may also be or comprise a corresponding machine-learning model ML1.

The process of training an ML model may involve providing an ML algorithm (also referred to as a learning algorithm) with training data. The training data may include the information sought, which may be referred to as a target or target attribute. The learning algorithm may find patterns in the training data that map the input data attributes to the target attributes. The result of the training process may be an ML model that captures the patterns. The ML model may then be used to make evaluate data for which the target attributes are not known.

In an exemplary implementation, the element rating mechanism(s) 114 may include machine-learning algorithm(s) that may be used to generate/train the machine-learning model ML1. In exemplary embodiments hereof, the element rating mechanism(s) 114 may include the resulting machine learning model ML1.

Figures 5A, 5B:
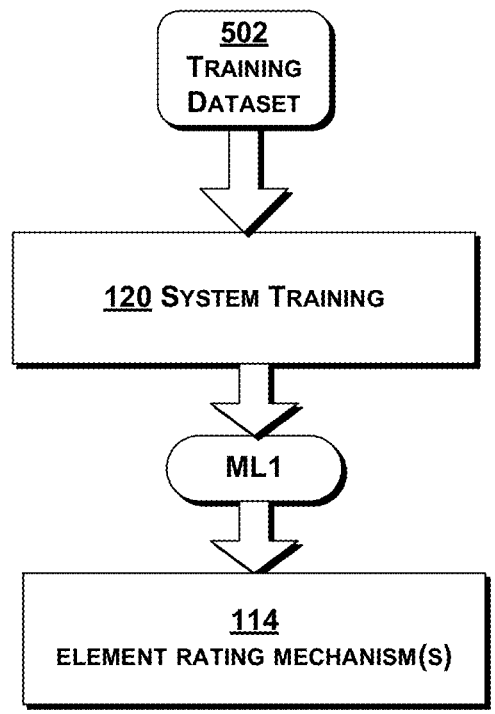

The element condition rating mechanism(s) 114 may be trained by providing the element rating mechanism(s) 114 a training dataset 502 of pre-rated training images (FIGS. 5A, 5B). As shown in FIG. 5A, an exemplary dataset of training images 502 may include multiple images. For each image in the training images 502, the dataset may include image information and corresponding element/ECR scores. In some embodiments, each image in the training dataset 502 includes only one property element and therefore only a single ECR or image score. The image score for each image in the training images 502 is preferably a series of probability values $P_0$ to $P_8$ corresponding to the predefined conditions $C_0$ to $C_8$ (e.g., as shown in FIG. 4C).

As should be appreciated, the training dataset 502 should use the same predefined conditions as will be used by the element rating mechanism 114. Thus, in a presently preferred implementation, the pre-assigned condition classes/ratings (ECRs) include those shown in Table I above.

Thus, the information for each training image in the training dataset may include: (1) an identification of the content in the image (e.g., the element(s) depicted in the image), and (2) a pre-determined condition rating of the specific content depicted (e.g., via human participation). In this way, the element rating mechanism(s) 114 may be trained to establish relationships between the element(s) shown in the training images and the pre-assessed condition rating applied to each of those elements.

With reference to FIG. 5B, the system training mechanism 120 produces a machine-learning model ML1 based on the training dataset 502. The machine learning model ML1 may be thus formed and used by (or as) the image rating mechanism(s) 114 to make data-driven evaluations regarding the condition ratings of elements shown in new images of a non-test property (i.e., a property that is not in the training dataset).

It may be preferable that each type of relevant element of a property (as described above) be represented in at least some of the training images. For example, it may be preferable that the training images include images and corresponding condition ratings of kitchens, master bedrooms, standard bedrooms, master bathrooms, standard bathrooms, exterior front of home images, exterior sides of home images, and other images of other relevant elements.

In one exemplary implementation, over one hundred and twenty thousand (120,000) human-labeled training images and corresponding scores (ECRs) were used in the training dataset 502. However, other numbers of training images and corresponding training ECRs may also be used.

In exemplary embodiments hereof, once the ML1 model has been formed, images of property elements of a non-test property P to be assessed may be input into the system 102 as described above (with reference to FIGS. 4A-4B). The element rating mechanism(s) 114 may use or comprise the ML1 model to estimate a condition class for each element depicted in each image, as described above with reference to FIGS. 4A-4B.

It is appreciated that the condition rating classes shown above are exemplary, and that any condition rating classes or combinations of condition rating classes may be used by the system 102. It is understood that the condition rating classes used by the system 102 do not limit the scope of the system 102 in any way.

For example, the image rating mechanism(s) 114 may estimate, from an image, that a kitchen in very good condition may have a 75% probability of a 7 rating (very_good_high) and a 20% probability of an 8 rating (new). The probabilities may be represented as decimals with values ranging from zero to one. Note that the image rating mechanism(s) 114 may output a probability rating for each element at each condition class, and that the summation of the probability decimal ratings across all condition classes for a particular element may exceed the value of one. These probabilities of condition classes/ratings for each element may correspond to the ECR 204-$k$ for each image 200-$k$ as described above. The probabilities ECR 204-$k$ for each element 202-$k$ may be stored in the element rating database(s) 134.

2. The Property Condition Rating Mechanism

As described above with reference to FIG. 2, the property condition rating mechanism(s) 116 may receive element condition ratings 204 from the element condition rating mechanism(s) 114 for each image 200 of a particular property P. The set of element condition ratings—ECRs—204 for the property P may then be processed by the property condition rating mechanism(s) 116 and used to determine an overall property condition rating (OCR) 206 of the property P.

With reference to FIGS. 6A-6C, the property rating mechanism 116 takes as input a set of image scores 602 (at 606 in FIG. 6B) and determines a corresponding property condition score 604 (at 608 in FIG. 6B). The property condition score 604 may be referred to herein as an overall condition rating (OCR) for the property.

The image scores 602 are preferably of the form output by the element rating mechanism 114 and described above with reference to FIG. 4C. If the individual image scores are based on n condition classes ($C_0 \ldots C_{n-1}$), then the property condition score is preferably a real number in the range 0 to n-1. In the examples given above, the system uses nine condition classes ($C_0, C_1, \ldots C_8$), and the property condition score is a real number in the range 0 to 8. It is understood that the use of a real numbers by the property rating mechanism 116 do not limit the scope of the property rating mechanism 116 in any way.

In some embodiments, the property condition score may be a vector or series of probability values (in the range 0.0 to 1.0), one value for each of the corresponding condition classes. The score may be determined as a function of these probability values (e.g., as a weighted function of these values or as the condition class with the highest probability).

The value of the property condition score corresponds to the overall condition of the property (as determined by the property rating mechanism 116). Thus, a property condition score of j corresponds to an overall property condition of class $C_j$.

The property condition rating mechanism 116 may include machine learning algorithms, models and capabilities similar to or the same as described above with reference to the element condition rating mechanism(s) 114.

In exemplary embodiments hereof, the property condition rating mechanism(s) 116 may include a machine learning (ML) (denoted model ML2) that may be trained to adequately process the provided element condition ratings (ECRs) 204 for a particular property P and to generate an overall condition rating OCR 206 for that property P. For the purposes of this specification, when the property condition rating mechanism 116 is referenced, it is understood that the reference may also be or comprise the machine-learning model ML2.

In exemplary implementations, the property rating mechanism 116 and/or the system training mechanism 120 may, alone or in combination, include machine learning algorithm(s) that may be used to generate/train the machine learning model ML2. The learning algorithm(s) may include supervised learning algorithm(s) such as robust generalized linear models for learning, or other types of learning algorithms. In exemplary embodiments hereof, the property rating mechanism 116 may include the resulting machine learning model ML2.

Figure 6D:
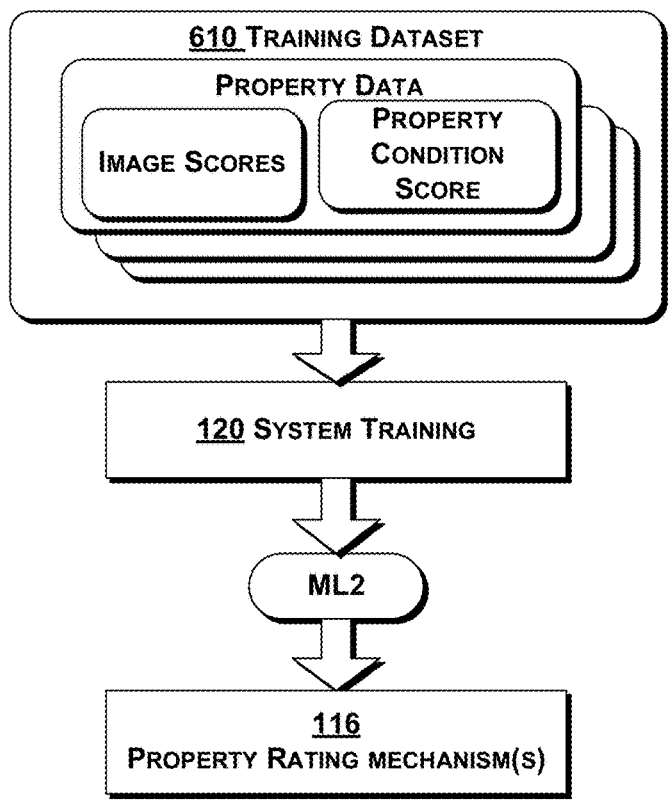

As shown in FIG. 6D, and according to exemplary embodiments hereof, the property rating mechanism 116 may be trained by providing the system training mechanism 120 a training dataset 610 of training element condition ratings for multiple training properties, each with a known overall property condition rating (OCR) or score. Thus, the training dataset 610 may include property data for each of a plurality of properties, where, for each property the corresponding property data includes image scores and a corresponding property condition score.

The learning algorithm(s) may discover and map relationships and patterns between the training element condition ratings and the corresponding OCRs of the training properties to create the ML2 model.

The property rating mechanism(s) 116 may then use the ML2 model to determine an overall condition rating (OCR) of a non-test property P given the element condition ratings of the non-test property P, e.g., as described above with reference to FIGS. 6A-6B.

The element condition ratings 304-*n* may be determined by the element condition rating mechanism(s) 114 using images 300-*n* of the property elements 302-*n*. The element condition rating mechanism(s) 114 may then provide the element condition ratings to the property condition rating mechanism(s) 116. However, the element condition ratings may also be provided from another source.

In exemplary embodiments hereof, the property condition rating mechanism 116 may use the ML2 model to estimate the probability of each condition class shown in Table I for the overall condition rating OCR 306 of a non-test property P.

The property condition rating mechanism 116 may generate a probability coefficient for the non-test property P for each class shown, for a subset of the classes shown, for a single class shown, or for any combinations of classes. In one example, the mechanism 116 may estimate that a non-test property P, whose provided element conditions ratings 304 scored medium high, may have an 85% probability of a 6 rating (very_good_low) and a 20% probability of an 5 rating (ok_average) as the property's overall condition rating (OCR) 306. Note also that the mechanism 116 may output a probability rating for the overall condition rating 306 at each condition class, and that the summation of the probability decimal ratings across all condition classes for the overall condition rating 306 may exceed the value of one. The overall condition rating 306 for the property P may be stored in the property rating database(s) 136. For example, the overall condition rating 306 may be stored as property information in the data structure shown in FIG. 3A.

In other exemplary embodiments hereof, the property condition rating mechanism 116 may use the ML2 model to determine a single overall condition rating 306 of the property P that may be a real number (e.g., from zero to eight) that may generally correspond to the condition classes shown above. The single overall condition rating 306 may be an average, root mean square, or some other type of numerical combination of the ECRs 304 provided for the property P. For example, the property condition rating mechanism 116 may assign an overall property condition rating 306 of 5.5 to the non-test property P.

In other exemplary embodiments hereof, the property condition rating mechanism 116 may use a weighted scale to numerically combine the ECRs. The weighting may be based, e.g., on the type of element shown in the image. For example, a kitchen with an ECR of 8 may be weighted higher, and therefore have more of an effect on the overall condition rating of the property P, than a bedroom with an ECR of 5. It is understood that the property rating mechanism 116 may use any mathematical, statistical or numerical operation or combination of operations to calculate an overall condition rating or score of the property P using the image scores 602 provided.

As should be appreciated, the condition rating classes shown above are meant for demonstration purposes and any condition rating classes or combinations of condition rating zo classes may be used by the system 102. It is understood that the condition rating classes used by the system 102 do not limit the scope of the system 102 in any way.

In an exemplary implementation, over one hundred thousand training image scores (ECRs) were used in the training dataset 610. However, other numbers of training ECRs and corresponding training OCRs may also be used.

Figure 7:
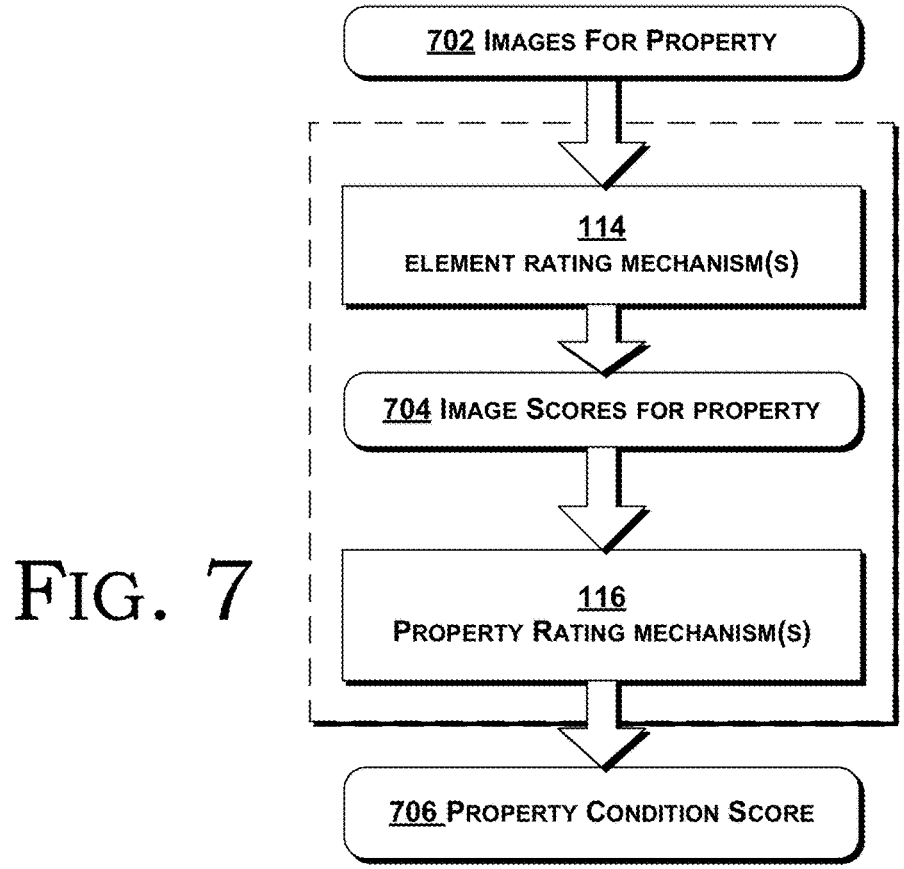
Figure 8A:
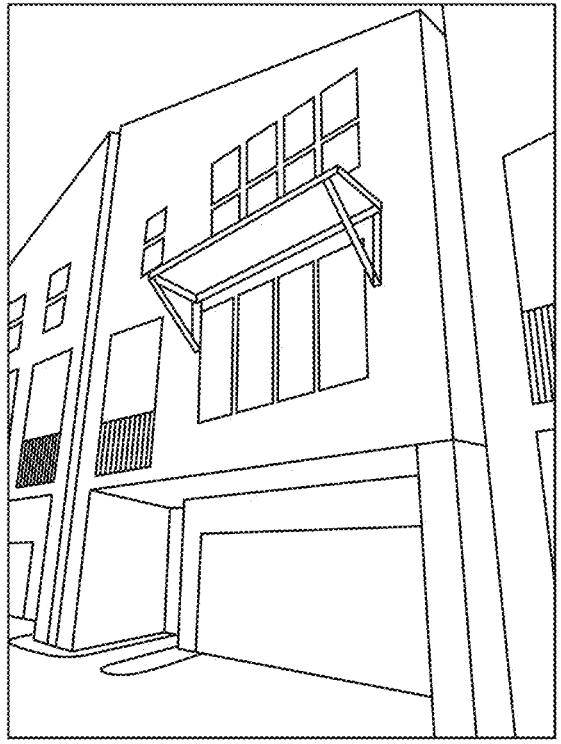
FIGS. 8A-8E, 9A-9D, 10A-10E, and 11A-11E depict various examples of application of exemplary embodiments hereof.
Figure 8B:
Figure 8C:
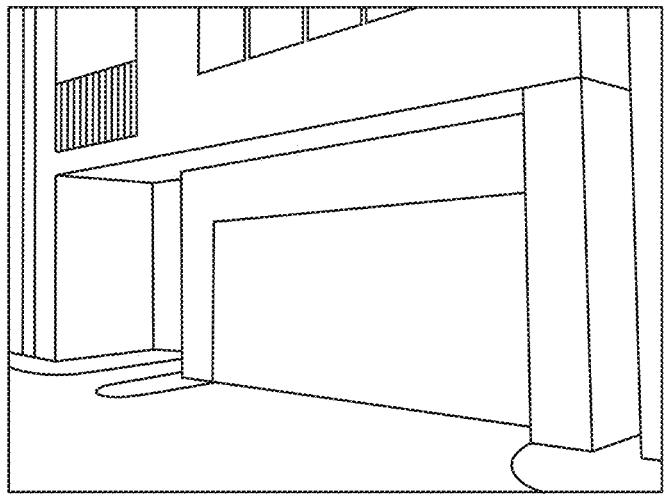
Figure 8D:
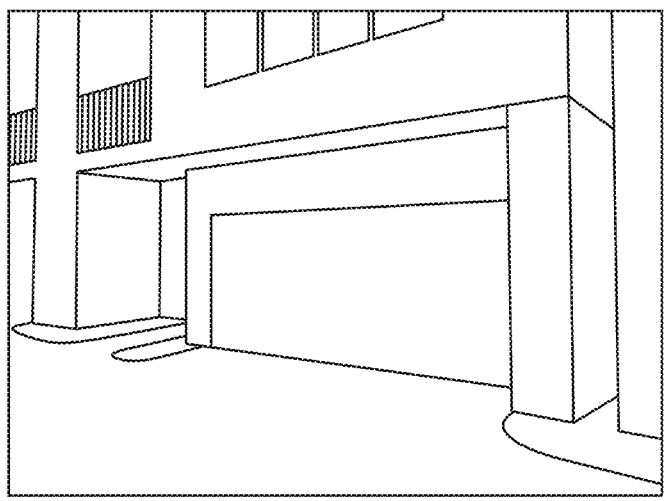
Figure 8E:
Figure 9A:
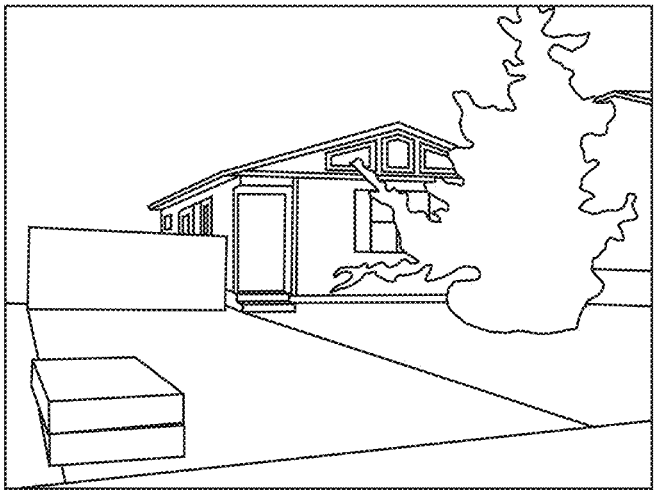
Figure 9B:
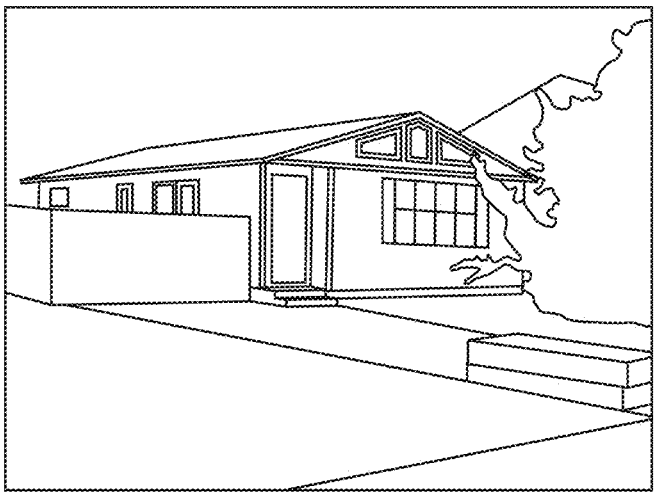
Figure 9C:
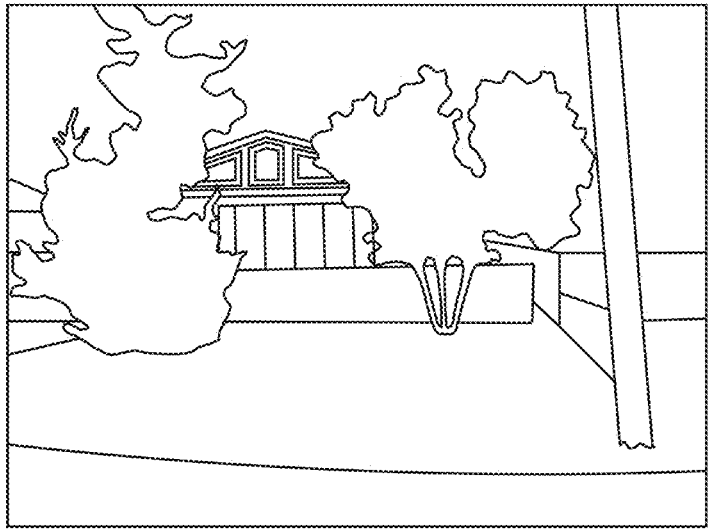
Figure 9D:
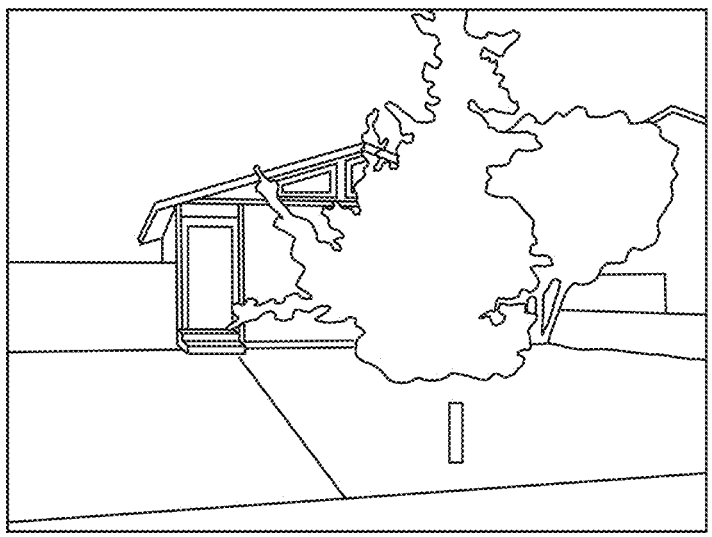
Figure 10A:
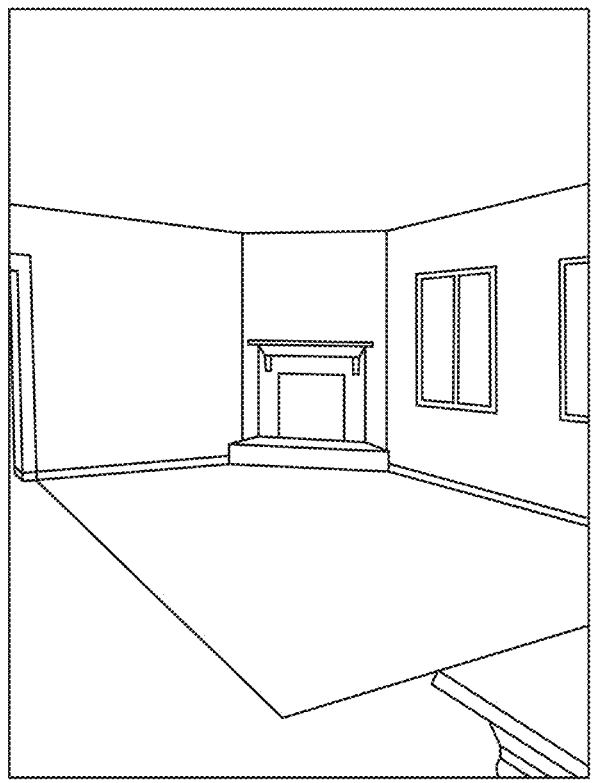
Figure 10B:
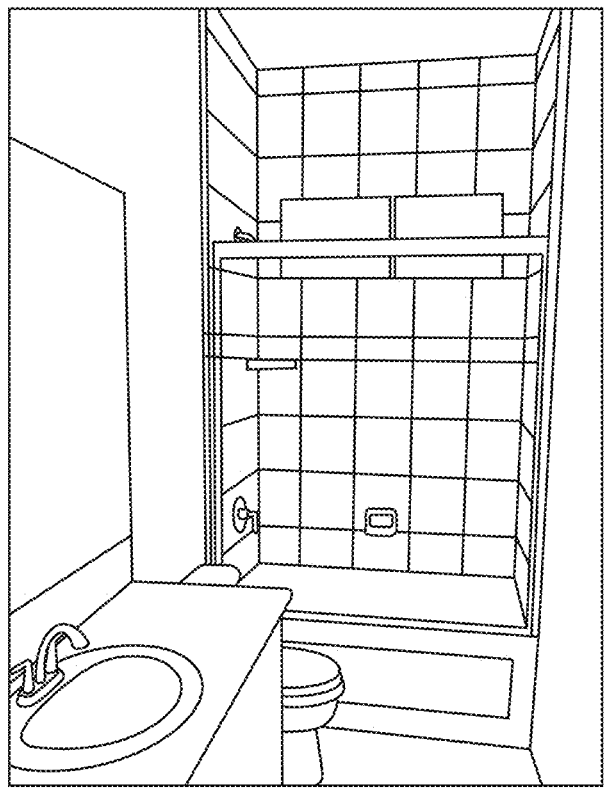
Figure 10C:
Figure 10D:
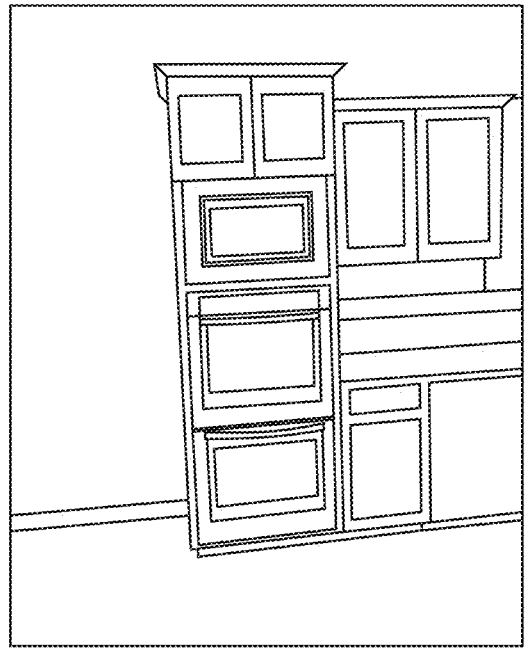
Figure 10E:
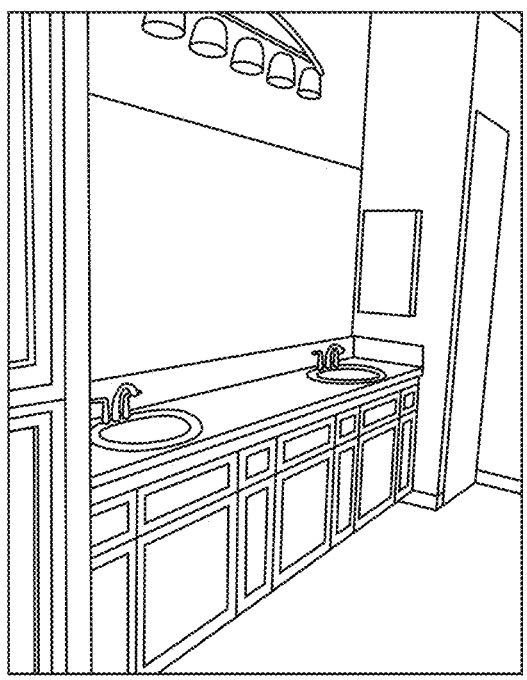
Figure 11A:
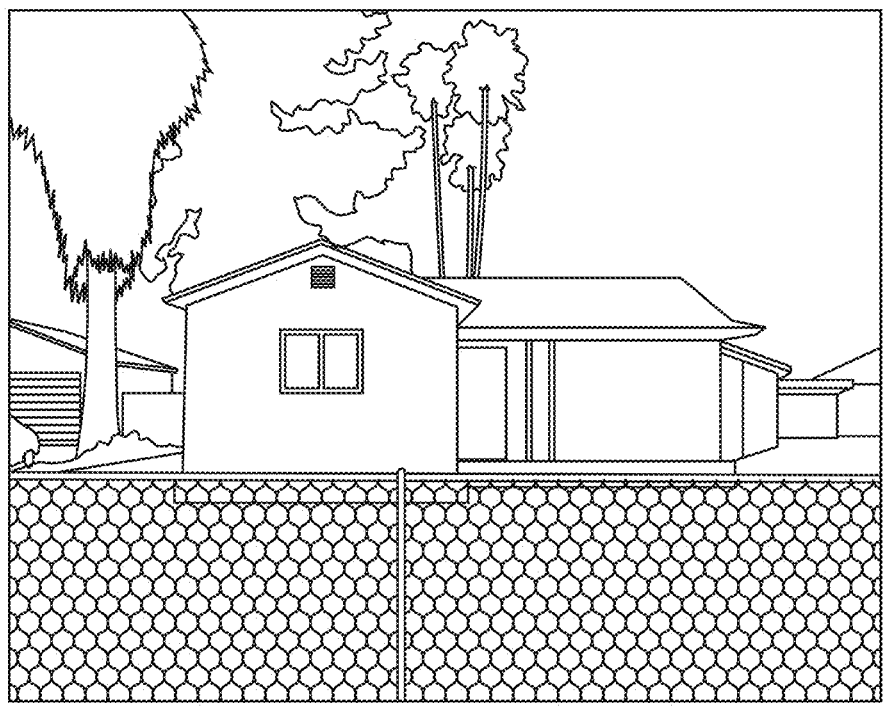
Figure 11B:
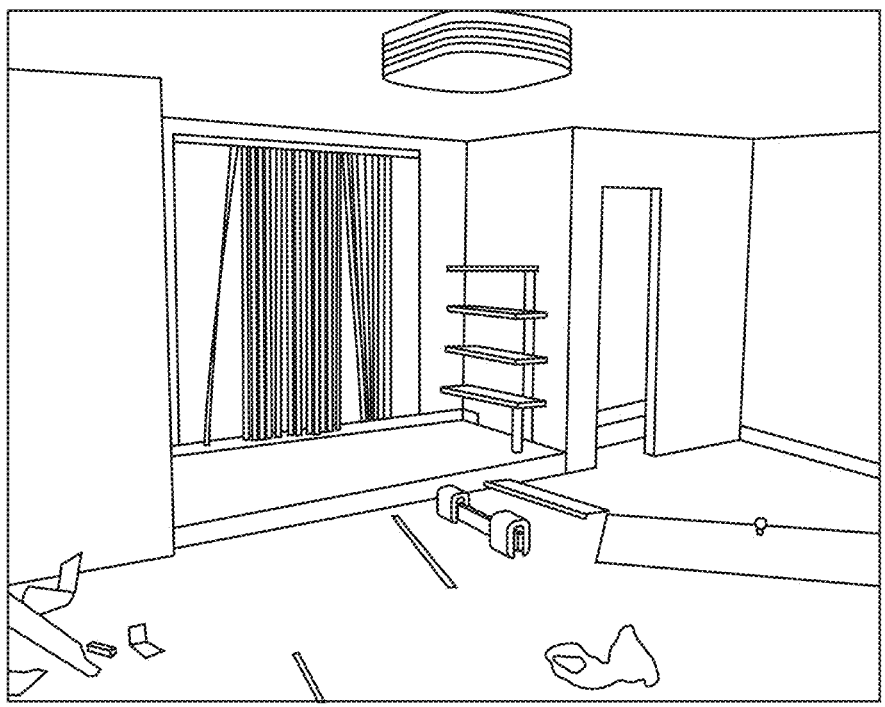
Figure 11C:
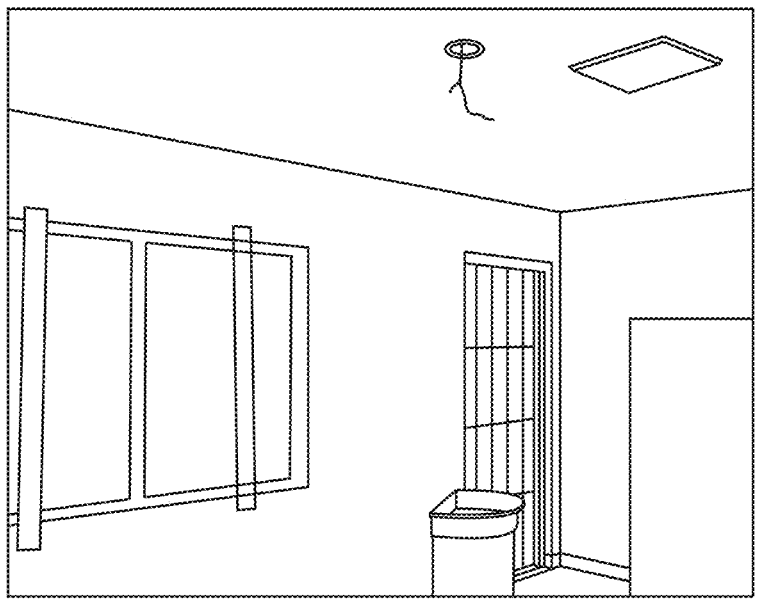
Figure 11D:
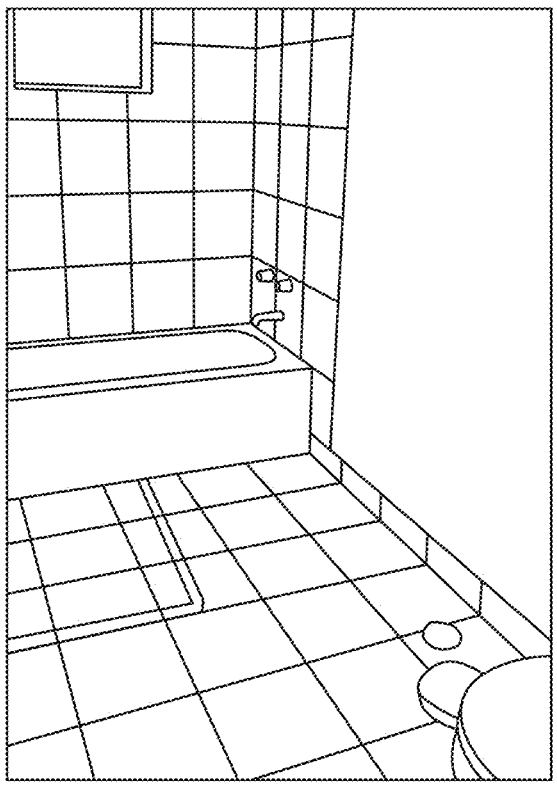
Figure 11E:
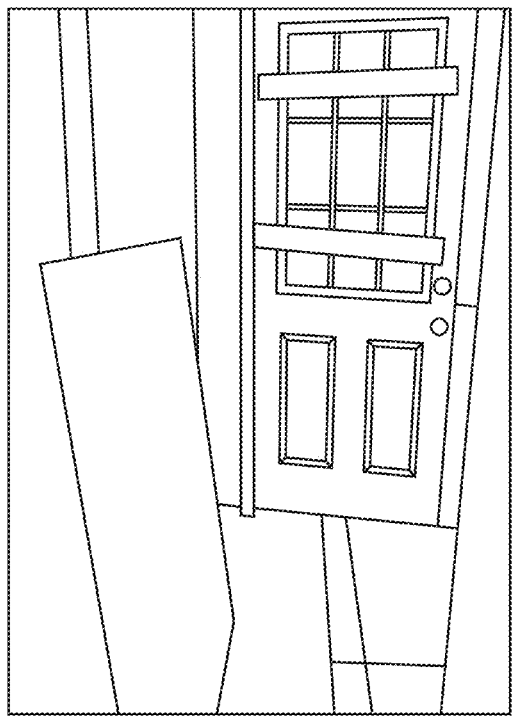

Although shown as separate mechanisms, the element condition rating mechanism 114 and the property condition rating mechanism 116 may together, in any combination, form a system or mechanism that may be referred to as an image-based condition classification model or system. For example, as shown in FIG. 7, a system formed by combining element-rating mechanism 114 with property rating mechanism 116 takes as input images 702 for a particular property. The element rating mechanism 114 is invoked on each image 702 and produces a corresponding series of image scores 704 for the property. These image scores 704 are then input to the property rating mechanism 116 to produce a corresponding property condition score 706 for the property.

Time-Based Property Conditions

The overall image-based condition rating of a particular property is the condition at the time(s) the corresponding images were acquired. Recall that each image preferably includes a timestamp, thereby providing image acquisition date information.

As should be appreciated, the same property may have different overall condition ratings across time. Embodiments hereof may determine and/or store multiple property condition ratings for a particular property, thereby allowing tracking of the evolution of property condition over time.

EXAMPLES

Various non-limiting examples are presented here.

Example 1

Five (5) external photographs were taken of a property P1 (FIGS. 8A-8E and 13A-13E). The photographs were input to the system described herein. In particular, the images were provided to the element condition rating mechanism(s) 114 using the nine (9) condition classes shown in Table I.

Note that each photograph contains a descriptor, e.g., input by the person taking the pictures.

The output of an implementation of the element rating mechanism 114 is shown in the following table, with the probabilities of the top three classes shown:

| FIG. | Human Label | Classes | Scores |
|---|---|---|---|
| 8A | exterior right | new | 0.783 |
| 13A | | ok | 0.162 |
| | | very good low | 0.033 |
| 8B | exterior left | new | 0.785 |
| 13B | | ok | 0.155 |
| | | very good low | 0.032 |
| 8C | front | new | 0.6 |
| 13C | | ok | 0.296 |
| | | very good high | 0.055 |
| 8D | exterior right | ok | 0.527 |
| 13D | | new | 0.25 |
| | | very good high | 0.118 |

-continued

| FIG. | Human Label | Classes | Scores |
|---|---|---|---|
| 8E | exterior left | new | 0.884 |
| 13E | | ok | 0.084 |
| | | very good high | 0.018 |

An implementation of the property condition rating mechanism 116 was applied to the image scores (the output of the element condition rating mechanism(s) 114), giving a mean image score of 7.5 which corresponds to a condition between very good high and new.

Example 2

Four (4) external photographs were taken of a property P2 (FIGS. 9A-9D and 14A-14D). The photographs were input to the system described herein.

Note that each photograph contains a descriptor, e.g., input by the person taking the pictures.

The nine (9) condition classes shown in Table I were used.

The output of an implementation of the element rating mechanism 114 is shown in the following table, with the probabilities of the top three classes shown:

| FIG. | Human Label | Classes | Scores |
|---|---|---|---|
| 9A | exterior left | subpar low | 0.73 |
| 14A | | bad high | 0.181 |
| | | subpar high | 0.066 |
| 9B | exterior left | subpar low | 0.557 |
| 14B | | bad high | 0.371 |
| | | bad low | 0.052 |
| 9C | front | bad high | 0.441 |
| 14C | | subpar low | 0.405 |
| | | subpar high | 0.069 |
| 9D | front | bad high | 0.587 |
| 14D | | subpar low | 0.204 |
| | | bad low | 0.104 |

An implementation of the property rating mechanism 116 was applied to the output of the element rating mechanism 114 for these images, giving a mean image score of 3.0 which corresponds to a "subpar low" condition.

Example 3

Five (5) internal photographs were taken of a property P3 (FIGS. 10A-10E and 15A-15E). The photographs were input to the system described herein.

The nine (9) condition classes shown in Table I above were used.

The output of an implementation of the element rating mechanism 114 is shown in the following table, with the probabilities of the top three classes shown.

| FIG. | Human Label | Classes | Scores |
|---|---|---|---|
| 10A | living room | new | 0.55 |
| 15A | | average | 0.3 |
| | | very good | 0.05 |
| 10B | bathroom | new | 0.92 |
| 15B | | good | 0.04 |
| | | very good | 0.01 |
| 10C | kitchen | new | 0.66 |
| 15C | | very good | 0.2 |
| | | good | 0.1 |
| 10D | kitchen | new | 0.83 |

| FIG. | Human Label | Classes | Scores |
|---|---|---|---|
| 15D | | good | 0.1 |
| | | average | 0.04 |
| 10E | bathroom | new | 0.67 |
| 15E | | very good | 0.25 |
| | | average | 0.01 |

An aggregate property condition was determined using an implementation of the property rating mechanism 116, giving a mean image score is 7.0.

Conclusion: property condition is very good high.

Example 4

Five (5) internal and external photographs were taken of a property P4 (FIGS. 11A-11E and 16E-16E). The photographs were input to the system as described herein. In particular, the images were provided to the element condition rating mechanism(s) 114 using the nine (9) condition classes shown in Table I above.

The output of an implementation of the element condition rating mechanism 114 is shown in the following table, with the probabilities of the top three classes shown:

| FIG. | Human Label | Classes | Scores |
|---|---|---|---|
| 11A | front | bad high | 0.6 |
| 16A | | bad low | 0.34 |
| | | subpar low | 0.05 |
| 11B | room | bad low | 0.94 |
| 16B | | fire damage | 0.04 |
| | | bad high | 0.01 |
| 11C | room | bad high | 0.77 |
| 16C | | bad low | 0.14 |
| | | subpar low | 0.07 |
| 11D | bathroom | bad high | 0.96 |
| 16C | | bad low | 0.02 |
| | | subpar low | 0.01 |
| 11E | door | bad high | 0.72 |
| 16E | | bad low | 0.18 |
| | | subpar low | 0.09 |

An aggregate property condition was determined using the information in the table (generated by the element condition rating mechanism(s) 114) and an implementation of the property condition rating mechanism 116, giving a mean image score of 1.5.

Conclusion: property condition is between bad low and bad high.

End of Examples

Portfolio Condition Rating

In some exemplary embodiments, an overall condition rating may be determined for a portfolio of properties, where the overall condition rating is based on the individual condition ratings of the properties in the portfolio. Thus, the property condition ratings of each property in portfolio may be combined to determine a portfolio condition rating. In general, the overall portfolio condition rating is a function of the property condition ratings of the properties in the portfolio. The function may simply average the property condition ratings. However, in some cases a weighted average or some other function may be used to determine the portfolio condition rating.

The portfolio condition rating may be a discrete value corresponding to one of a plurality of discrete property conditions or a real value corresponding to a continuous range of discrete property conditions.

The portfolio condition rating may, but need not be, the same scale or type as the individual property condition ratings. For example, the individual property condition ratings may be discrete values corresponding to one of a plurality of discrete property conditions, while the overall portfolio condition rating may be a real value corresponding to a continuous range of discrete property conditions (and vice versa).

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 12:
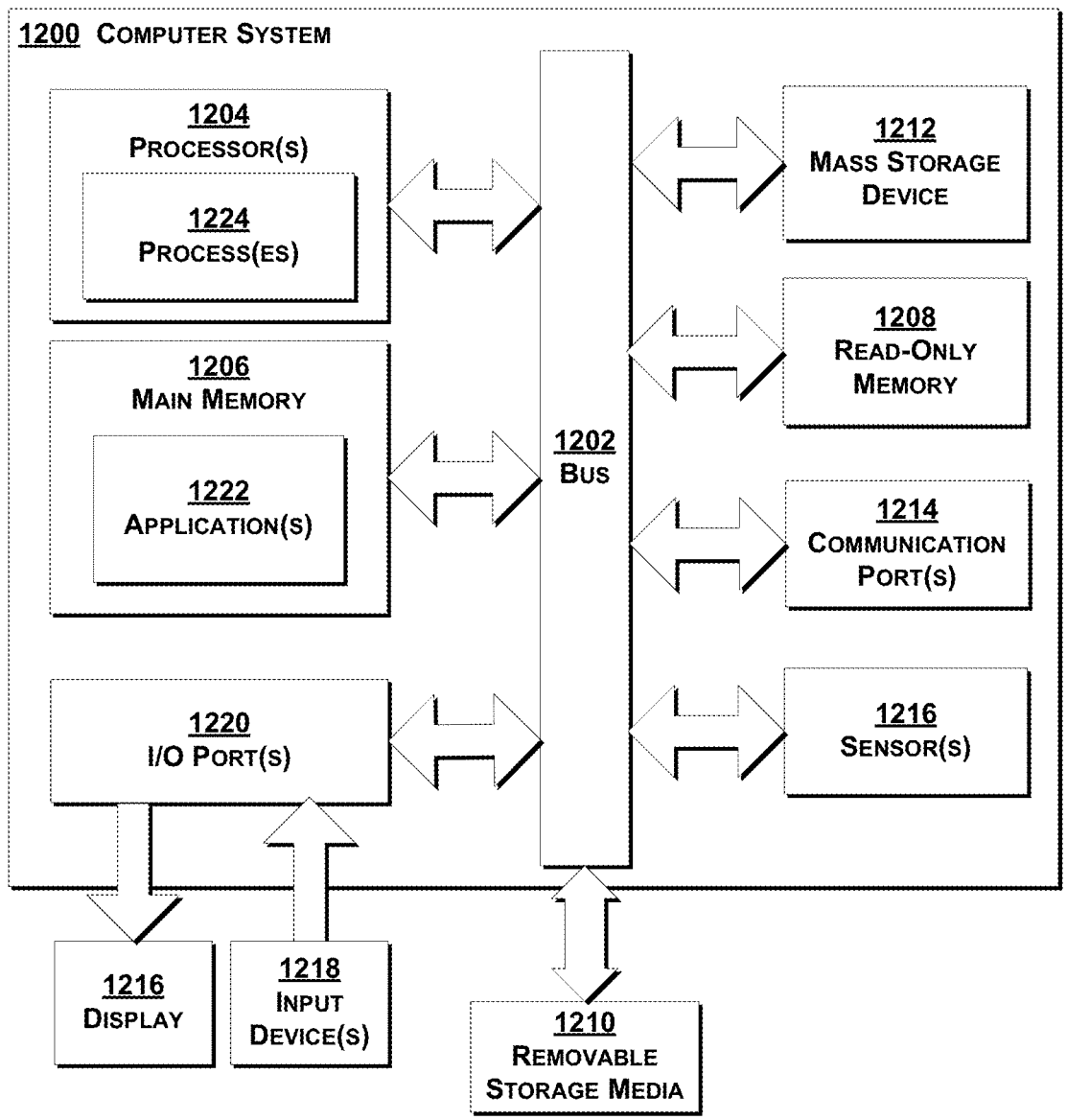
FIG. 12 depicts aspects of computing and computer devices in accordance with exemplary embodiments hereof.
Figure 13A:
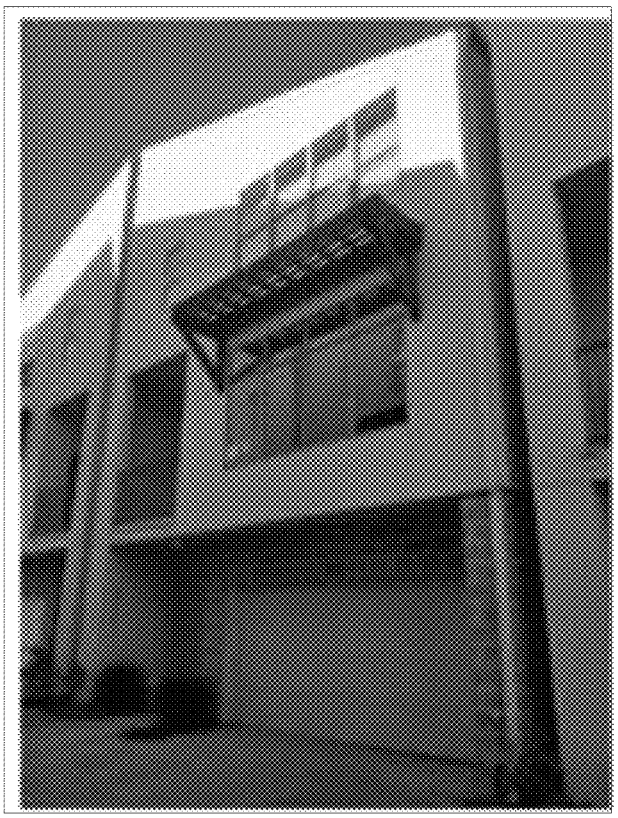
Figure 13B:
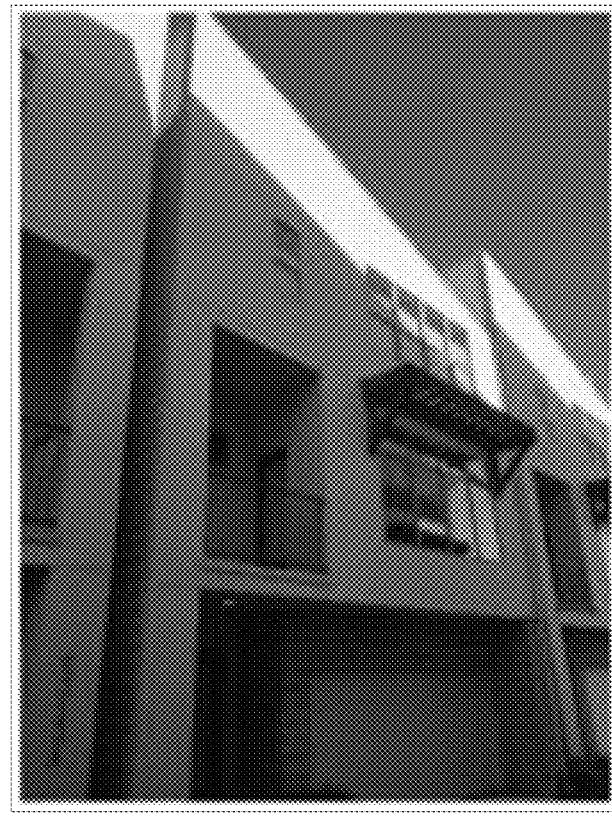
Figure 13C:
Figure 13D:
Figure 13E:
Figure 15C:
Figure 15D:
Figure 15E:
Figure 16A:
Figure 16B:
Figure 16C:
Figure 16D:
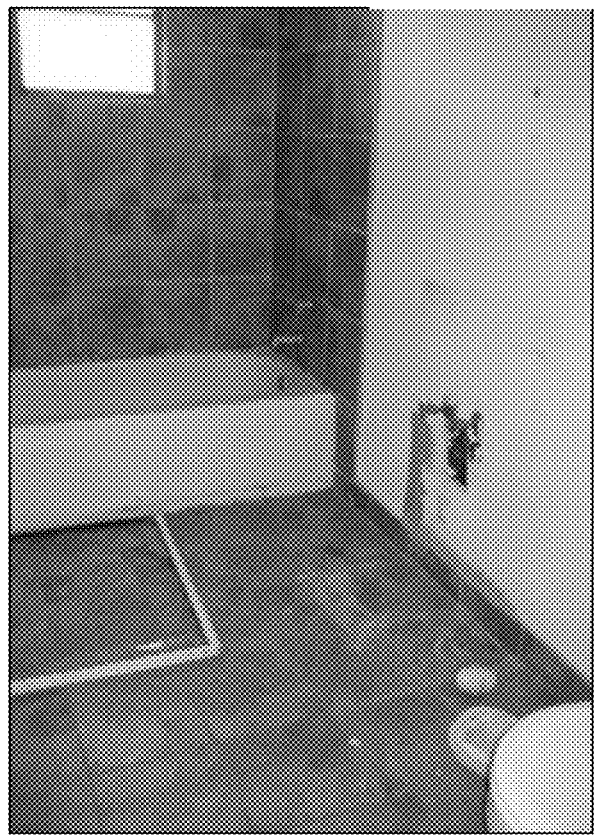
Figure 16E:

FIG. 12 is a schematic diagram of a computer system 1200 upon which embodiments of the present disclosure may be implemented and carried out.

According to the present example, the computer system 1200 includes a bus 1202 (i.e., interconnect), one or more processors 1204, a main memory 1206, read-only memory (ROM) 1208, removable storage media 1210, and mass storage 1212, and one or more communications ports 1214. Communication port(s) 1214 may be connected to one or more networks (not shown) whereby the computer system 1200 may receive and/or transmit data.

As used herein, a "processor" means one or more microprocessors, central processing units (CPUs), graphics processing units (GPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1204 can be (or include) any known processor, such as, but not limited to, an Intel® Itanium® or Itanium 2® processor(s), AMD® Opteron® or Athlon MP® processor(s), or Motorola® lines of processors, and the like.

Communications port(s) 1214 can be any of an RS-232 port for use with a modem based dial-up connection, a 10/100 Ethernet port, a Gigabit port using copper or fiber, or a USB port, and the like. Communications port(s) 1214 may be chosen depending on a network such as a Local Area Network (LAN), a Wide Area Network (WAN), a CDN, or any network to which the computer system 1200 connects. The computer system 1200 may be in communication with peripheral devices (e.g., display screen 1216, input device(s)

1218) via Input/Output (I/O) port 1220. Some or all of the peripheral devices may be integrated into the computer system 1200, and the input device(s) 1218 may be integrated into the display screen 1216 (e.g., in the case of a touch screen).

Main memory 1206 may be Random Access Memory (RAM), or any other dynamic storage device(s) commonly known in the art. Read-only memory 1208 can be any static storage device(s) such as Programmable Read-Only Memory (PROM) chips for storing static information such as instructions for processor(s) 1204. Mass storage 1212 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1202 communicatively couples processor(s) 1204 with the other memory, storage and communications blocks. Bus 1202 can be a PCI/PCI-X, SCSI, a Universal Serial Bus (USB) based system bus (or other) depending on the storage devices used, and the like. Removable storage media 1210 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1206 is encoded with applications(s) 1222 that support(s) the functionality as discussed herein (an application 1222 may be an mechanism that provides some or all of the functionality of one or more of the mechanisms described herein). Application(s) 1222 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1204 accesses main memory 1206 via the use of bus 1202 in order to launch, run, execute, interpret or otherwise perform the logic instructions of the application(s) 1222. Execution of application(s) 1222 produces processing functionality of the service(s) or mechanism(s) related to the application(s). In other words, the process(es) 1224 represents one or more portions of the application(s) 1222 performing within or upon the processor(s) 1204 in the computer system 1200.

It should be noted that, in addition to the process(es) 1224 that carries(carry) out operations as discussed herein, other embodiments herein include the application 1222 itself (i.e., the un-executed or non-performing logic instructions and/or data). The application 1222 may be stored on a computer readable medium (e.g., a repository) such as a disk or in an optical medium. According to other embodiments, the application 1222 can also be stored in a memory type system such as in firmware, read only memory (ROM), or, as in this example, as executable code within the main memory 1206 (e.g., within Random Access Memory or RAM). For example, application 1222 may also be stored in removable storage media 1210, read-only memory 1208, and/or mass storage device 1212.

Those skilled in the art will understand that the computer system 1200 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Conclusion

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps or acts described in the specification may be performed in any order or simultaneously, unless the context clearly indicates otherwise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A computer-implemented method of determining an overall condition rating of a portfolio comprising a plurality of properties, the method comprising:
    (A) determining a plurality of property condition ratings by, for each particular property in the portfolio,
        (A)(1) determining a particular property condition rating for said particular property based on one or more images of the particular property; and
    (B) determining the overall condition rating of the portfolio as a given function of the plurality of property condition ratings determined in (A),
    wherein the given function averages the plurality of property condition ratings to determine the overall condition rating of the portfolio, and
    wherein the given function determines a weighted average of the plurality of property condition ratings to determine the overall condition rating of the portfolio.

2. The method of claim 1, wherein said determining in (A)(1) further comprises:
    determining one or more element condition ratings corresponding to said one or more images of the particular property, wherein
    said particular property condition rating is based on said one or more element condition ratings.

3. The method of claim 2, wherein said one or more element condition ratings are determined by an element condition rating mechanism that was trained on a plurality of known images with known condition ratings.

4. The method of claim 1, wherein a particular property condition rating of at least one property in the portfolio is determined by a property condition rating mechanism that was trained on a plurality of known images with known condition ratings.

5. The method of claim 1, wherein each of said one or more images of the particular property represents at least one element of the particular property.

6. The method of claim 5, wherein the at least one element of the particular property is selected from a group comprising: a kitchen, a room, a master bedroom, a master bathroom, a bedroom, a bathroom, a living room, a house, a front of a house, a side of a house, a back of house, a basement, a yard of a house, a door, a roof, a fence, and a window.

7. The method of claim 1, wherein a particular property condition rating of each particular property is time-based.

8. The method of claim 1, wherein the images used to determine the particular property condition rating of a particular property were selected based on time and/or date information associated with an image.

9. The method of claim 1, wherein the overall condition rating of the portfolio is time-based.

10. The method of claim 1, wherein each property in the portfolio is a real property.

11. An article of manufacture comprising non-transitory computer-readable media having computer-readable instructions stored thereon, the computer-readable instructions including instructions for implementing a computer-implemented method, said method operable on a device comprising hardware including memory and at least one processor and running a service on said hardware, said method comprising the method of claim 1.

12. A device, comprising:
   (a) hardware including memory and at least one processor, and
   (b) a service running on said hardware, wherein said service is configured to perform the method of claim 1.

13. The method of claim 1, wherein the particular property condition rating of a particular property is a discrete value corresponding to one of a plurality of discrete property conditions.

14. The method of claim 1, wherein the particular property condition rating of a particular property is a real value corresponding to a continuous range of discrete property conditions.

15. The method of claim 1, wherein the overall condition rating of the portfolio is a discrete value corresponding to one of a plurality of discrete property conditions.

16. The method of claim 1, wherein the overall condition rating of the portfolio is a real value corresponding to a continuous range of discrete property conditions.

17. A computer-implemented method of determining an overall condition rating of a portfolio comprising a plurality of properties, the method comprising:
   (A) determining a plurality of property condition ratings by, for each particular property in the portfolio,
      (A)(1) determining a particular property condition rating for said particular property based on one or more images of the particular property; and
   (B) determining the overall condition rating of the portfolio as a given function of the plurality of property condition ratings determined in (A),
   wherein the particular property condition rating of a particular property is a discrete value corresponding to one of a plurality of discrete property conditions.

18. A computer-implemented method of determining an overall condition rating of a portfolio comprising a plurality of properties, the method comprising:
   (A) determining a plurality of property condition ratings by, for each particular property in the portfolio,
      (A)(1) determining a particular property condition rating for said particular property based on one or more images of the particular property; and
   (B) determining the overall condition rating of the portfolio as a given function of the plurality of property condition ratings determined in (A),
   wherein the particular property condition rating of a particular property is a real value corresponding to a continuous range of discrete property conditions.

19. A computer-implemented method of determining an overall condition rating of a portfolio comprising a plurality of properties, the method comprising:
   (A) determining a plurality of property condition ratings by, for each particular property in the portfolio,
      (A)(1) determining a particular property condition rating for said particular property based on one or more images of the particular property; and
   (B) determining the overall condition rating of the portfolio as a given function of the plurality of property condition ratings determined in (A),
   wherein the overall condition rating of the portfolio is a discrete value corresponding to one of a plurality of discrete property conditions.

20. A computer-implemented method of determining an overall condition rating of a portfolio comprising a plurality of properties, the method comprising:
   (A) determining a plurality of property condition ratings by, for each particular property in the portfolio,
      (A)(1) determining a particular property condition rating for said particular property based on one or more images of the particular property; and
   (B) determining the overall condition rating of the portfolio as a given function of the plurality of property condition ratings determined in (A),
   wherein the overall condition rating of the portfolio is a real value corresponding to a continuous range of discrete property conditions.

* * * * *